United States Patent
Chang

(10) Patent No.: US 10,760,731 B2
(45) Date of Patent: Sep. 1, 2020

(54) ARM-SUPPORTING STRUCTURE

(71) Applicant: KUNSHAN HONGJIE ELECTRONICS CO., LTD., Kunshan, Jiangsu (CN)

(72) Inventor: Xiaojie Chang, Jiangsu (CN)

(73) Assignee: KUNSHAN HONGJIE ELECTRONICS CO., LTD., Kunshan, Jiangsu (CN)

(*) Notice: Subject to any disclaimer, the term of this patent is extended or adjusted under 35 U.S.C. 154(b) by 105 days.

(21) Appl. No.: 15/941,226

(22) Filed: Mar. 30, 2018

(65) Prior Publication Data
US 2019/0178440 A1 Jun. 13, 2019

(30) Foreign Application Priority Data
Dec. 7, 2017 (CN) ............... 2017 1 1286937

(51) Int. Cl.
*F16M 13/02* (2006.01)
*F16F 9/02* (2006.01)
*F16F 9/54* (2006.01)

(52) U.S. Cl.
CPC ......... *F16M 13/022* (2013.01); *F16F 9/0245* (2013.01); *F16F 9/54* (2013.01); *F16F 2230/0005* (2013.01); *F16M 2200/063* (2013.01)

(58) Field of Classification Search
CPC ........... F16M 2200/063; F16M 13/022; F16M 2200/04; F16M 11/2092; F16M 11/10; F16M 11/2021; F16F 9/0245; F16F 2230/0005; F16F 9/54
USPC .............. 248/575, 280.11, 284.1, 281.11
See application file for complete search history.

(56) References Cited

U.S. PATENT DOCUMENTS

| | | | | |
|---|---|---|---|---|
| 1,078,577 A | * | 11/1913 | Fox ................. | F16F 15/02 248/569 |
| 4,591,122 A | * | 5/1986 | Kreuzer ............. | A61B 6/447 248/281.11 |
| 4,826,123 A | * | 5/1989 | Hannah ............. | A47B 21/0314 248/248 |
| 5,743,503 A | * | 4/1998 | Voeller ............. | F16M 11/08 248/284.1 |
| 5,826,846 A | * | 10/1998 | Buccieri ............ | F16M 11/10 248/280.11 |

(Continued)

*Primary Examiner* — Ingrid M Weinhold
(74) *Attorney, Agent, or Firm* — Leason Ellis LLP

(57) ABSTRACT

Provided is an arm-supporting structure, including a front arm connector, a rear arm connector, an adjusting means for an upper support and a lower support, and an elastic supporting means. The front arm connector, the upper support, the rear arm connector and the lower support are articulated sequentially to form a parallelogram structure. The upper end and the lower end of the adjusting means are articulated with the upper support and the lower support, respectively. Two ends of the elastic supporting means are connected with the adjusting means and the upper support, respectively. The elastic supporting means has a length that is elastically stretchable. The adjusting means automatically adjusts its position in accordance with the swinging of the upper support and the lower support, shifts the position of the fulcrum of the elastic supporting means, and automatically reaches a balance of force.

2 Claims, 5 Drawing Sheets

(56) References Cited

U.S. PATENT DOCUMENTS

| | | | | |
|---|---|---|---|---|
| 5,975,472 A * | 11/1999 | Hung | F16M 11/105 | 248/278.1 |
| 5,992,809 A * | 11/1999 | Sweere | A47B 21/00 | 248/278.1 |
| 6,012,693 A * | 1/2000 | Voeller | F16M 11/048 | 248/279.1 |
| 6,592,090 B1 * | 7/2003 | Li | F16M 11/2092 | 248/284.1 |
| 7,338,022 B2 * | 3/2008 | Hung | F16M 11/041 | 248/278.1 |
| 7,748,666 B2 * | 7/2010 | Oddsen, Jr. | F16M 11/10 | 248/123.11 |
| 8,366,060 B2 * | 2/2013 | Hung | F16M 11/041 | 248/124.1 |
| 8,777,172 B2 * | 7/2014 | Sapper | F16M 11/08 | 248/274.1 |
| 8,960,632 B2 * | 2/2015 | Fallows | F16M 11/2092 | 248/276.1 |
| 9,243,743 B2 * | 1/2016 | Hunter | F16M 13/02 | |
| 9,657,889 B1 * | 5/2017 | Chumakov | F16M 11/10 | |
| 2005/0224670 A1 * | 10/2005 | Metelski | F16M 11/2064 | 248/280.11 |
| 2005/0230585 A1 * | 10/2005 | Hung | F16M 11/10 | 248/278.1 |
| 2006/0231710 A1 * | 10/2006 | Huang | F16M 11/2064 | 248/291.1 |
| 2007/0102596 A1 * | 5/2007 | Sung | F16M 11/105 | 248/122.1 |
| 2007/0108355 A1 * | 5/2007 | Li | F16M 11/2092 | 248/280.11 |
| 2008/0029670 A1 * | 2/2008 | Hung | F16M 11/041 | 248/278.1 |
| 2011/0147546 A1 * | 6/2011 | Monsalve | F16M 11/041 | 248/122.1 |
| 2011/0260017 A1 * | 10/2011 | Monsalve | F16M 11/2014 | 248/201 |
| 2011/0315843 A1 * | 12/2011 | Hung | F16M 11/2092 | 248/279.1 |
| 2013/0009034 A1 * | 1/2013 | Fallows | F16M 11/2092 | 248/575 |
| 2013/0161465 A1 * | 6/2013 | Huang | F16M 11/08 | 248/278.1 |
| 2017/0082819 A1 * | 3/2017 | Vasseur | G02B 7/001 | |

* cited by examiner

ARM-SUPPORTING STRUCTURE

CROSS-REFERENCE TO RELATED APPLICATIONS

The present application claims a priority of Chinese Patent Application No. 201711286937.X filed with the China Patent Office on Dec. 7, 2017, the content of which is incorporated herein to its entirety.

TECHNICAL FIELD

The present disclosure relates to a bracket, and particularly to an arm-supporting structure.

BACKGROUND ART

In general, brackets for mounting electronic devices, such as display bracket, television bracket and projector bracket, are made to support an electronic device and adjust its height through an arm. At present, the arm-structure for height adjustment and support is achieved as follows. One end of both of the upper support and the lower support is articulated (i.e., in hinge connection) to a base, and the other end thereof is articulated to a connector. The base is provided thereon with a screw which is locked in axial direction but rotatable in a circumferential direction. A nut screw that is connected onto the screw is articulated with one end of a gas spring, and the other end of the gas spring is articulated with the upper support, so as to provide support. One end of the gas spring is made to move up and down by adjusting the screw, so that the length of one side of a triangle formed by the gas spring, the base and the upper support is varied so as to change the elastic support force of the gas spring. Since the fulcrum of the screw and the fulcrum of the gas spring are both located on the base, no matter how the arm is swinging, the fulcrum position of the gas spring remains unchanged. Additionally, there is no connection between the lower support and the gas spring as well as between the lower support and the adjusting means. The lower arm only functions to keep the swivel head horizontal when ascending or descending a device, rather than to support the device. As a result, such an arm-structure has a limited bearing capacity which is normally from 3 kg to 9 kg. When no or only a light electronic device is suspended, it is difficult to perform adjustment and the arm intends to lift up automatically. On the other hand, when a heavy electronic device is suspended, the arm intends to decline downward. Such an arm structure has a poor bearing capacity and is prone to being jammed. This in turn requires great effort to make adjustment, and the adjustment may not be smooth.

DISCLOSURE OF THE INVENTION

To overcome the above deficiencies, the present disclosure provides an arm-supporting structure which is easy to operate, flexible and smooth to adjust, and effort-saving.

To solve the technical problem, the present disclosure employs the following technical solution: an arm-supporting structure, including a front arm connector, a rear arm connector, an adjusting means for an upper support and a lower support, and an elastic supporting means, where the front arm connector, the upper support, the rear arm connector and the lower support are articulated (i.e., in hinge connection) sequentially to form a parallelogram structure. An upper end and a lower end of the adjusting means are articulated with the upper support and the lower support, respectively. Two ends of the elastic supporting means are connected to the adjusting means and the upper support, respectively. The elastic supporting means is elastically stretchable in length.

As a further improvement to the present disclosure, the adjusting means is configured to be parallel to the rear arm connector and the front arm connector.

As further improvements to the present disclosure, the adjusting means includes a bracket, a slide block and a height adjusting mechanism, where an upper end and a lower end of the bracket are articulated with the upper support and the lower support, respectively, where the slide block can be positioned movably on the bracket along extension direction of the bracket, where the height adjusting means can drive the slide block to move, and where one end of the elastic supporting means is articulated with the slide block.

As further improvements to the present disclosure, the height adjusting means is an adjusting screw that is rotatably positioned on the bracket in circumferential direction but non-movable in axial direction, where the adjusting screw is in threaded connection with the slide block, and where the upper support is provided thereon with a hollow portion that directly faces a head portion of the adjusting screw.

As further improvements to the present disclosure, two sides of the slide block are provided with a first articulating shaft that extends along horizontal direction, where one end of the elastic supporting means is provided with a U-shaped member having two connecting arm, where the connecting arms of the U-shaped member are sleeved on two sides of the slide block, and where each of the connecting arms of the U-shaped member is provided with a shaft hole, a bearing is provided in the shaft hole, and the first articulating shaft on the two sidewalls of the slide block are inserted into the bearings.

As further improvements to the present disclosure, the elastic supporting means is provided thereon with a stud that extends in an axial direction of the elastic supporting means, where the U-shaped member is provided thereon with a threaded hole, and the stud on the elastic supporting means is in threaded connection with the threaded hole on the U-shaped member.

As a further improvement to the present disclosure, the elastic supporting means is a gas spring.

As further improvements to the present disclosure, the two sidewalls of an upper end of the adjusting means are each provided with a second articulating shaft that extends in a horizontal direction, where inner side surfaces of the upper support are provided thereon with opening slots, where the second articulating shafts are rotatably inserted into the opening slots of the upper support, where two sidewalls at a lower end of the adjusting means are each provided with a threaded connecting hole that extends axially in the horizontal direction, where two sidewalls at one end of the lower support are each provided with a through-hole, and a connecting screw is further provided, with the connecting screw being configured to pass (or penetrate) through the through-holes in the two sidewalls at the one end of the lower support and being in threaded connection with the threaded connecting holes on the adjusting means.

As further improvements to the present disclosure, each of the opening slots on the upper support is an elongated opening slot structure that is perpendicular to the inner side surfaces of the upper support, and where opening portions of the opening slots at the inner side surfaces are each provided with a chamfer structure.

As further improvements to the present disclosure, the upper support and the lower support are U-shaped structures with openings of the U-shaped structures opposing to each other, where sidewalls at two ends of the upper support and sidewalls at two ends of the lower support are each configured to have an arc-shaped end face, where the front arm connector and the rear arm connector are respectively inserted into interiors of the two ends of the upper support and the lower support, where a sidewall of the rear arm connector is further provided thereon with a curved stepped stopping face that matches the arc-shaped end faces of the upper support and the lower support, such that the arc-shaped end faces of the upper support and the lower support are rotatably stopped by the curved stepped stopping face of the rear arm connector.

The present disclosure provides the following beneficial technical effects: by articulating the upper end and the lower end of the adjusting means with the upper support and the lower support, respectively, the upper support and the lower support together provide a support for the adjusting means, such that a large support strength is provided and a greater weight can be bore. Moreover, the position of the adjusting means can be automatically adjusted with the swinging of the upper support and the lower support, which allows the position of the fulcrum of the elastic supporting means to be shifted and a balance of force to be achieved spontaneously. This protects the adjusting means from bearing a torque, and makes the adjusting means time-saving, effort-saving and easy to adjust. Thanks to the self-balancing system, the bracket can be kept at a stable position during the installation of an electronic device of any weight. The bracket can also be kept stable when no electronic device is mounted thereon, and will not incline upward. This increases the weight range of the electronic devices that can be suspended thereon.

BRIEF DESCRIPTION OF DRAWINGS

FIG. 3 is a front view according to the first embodiment of the present disclosure;
FIG. 4 is a left view according to the first embodiment of the present disclosure;
FIG. 6 is a front view according to the second embodiment of the present disclosure;
FIG. 7 is a left view according to the second embodiment of the present disclosure.

DETAILED DESCRIPTION OF EMBODIMENTS

Figure 1:
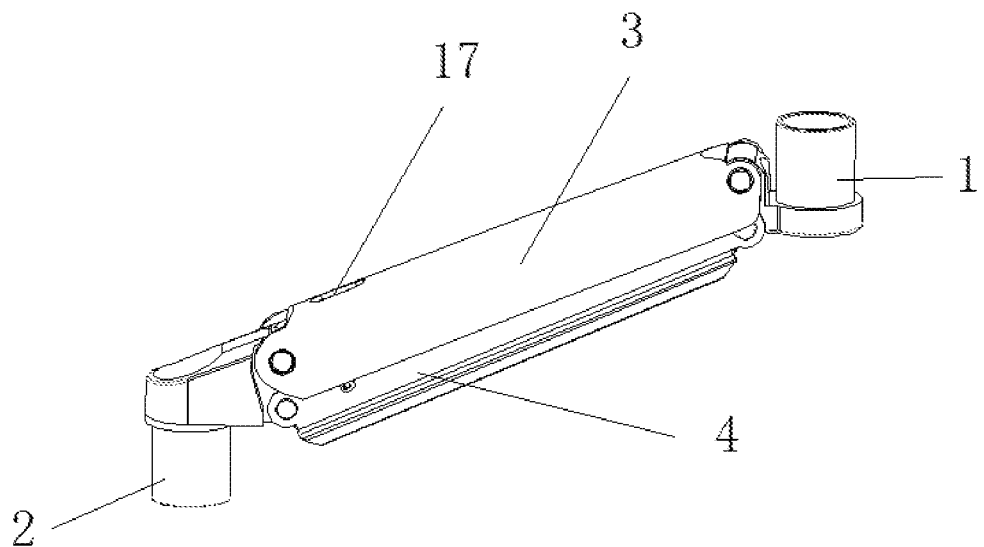
FIG. 1 is a perspective view of the present disclosure.
Figure 2:
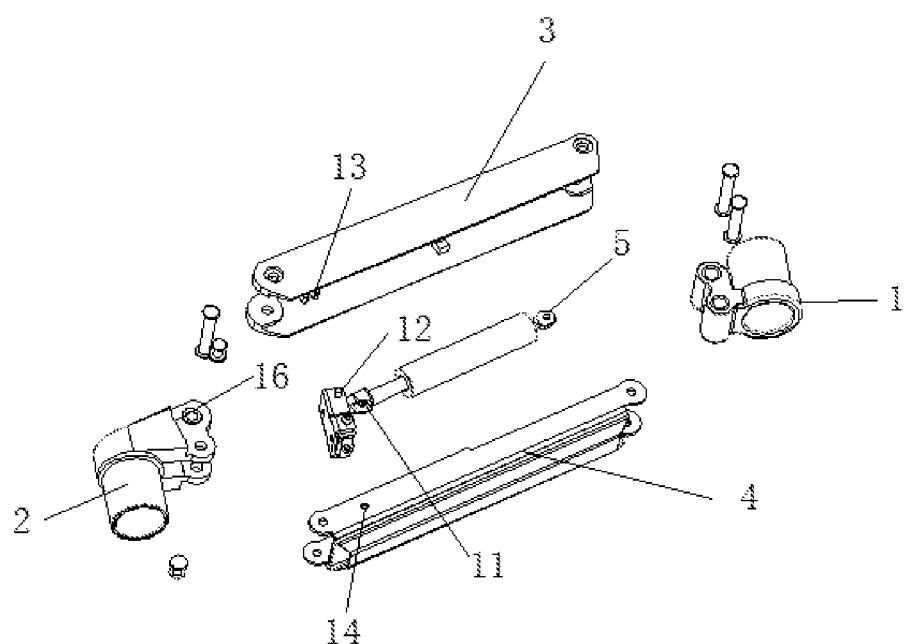
FIG. 2 is an exploded view of the present disclosure.
Figure 3:
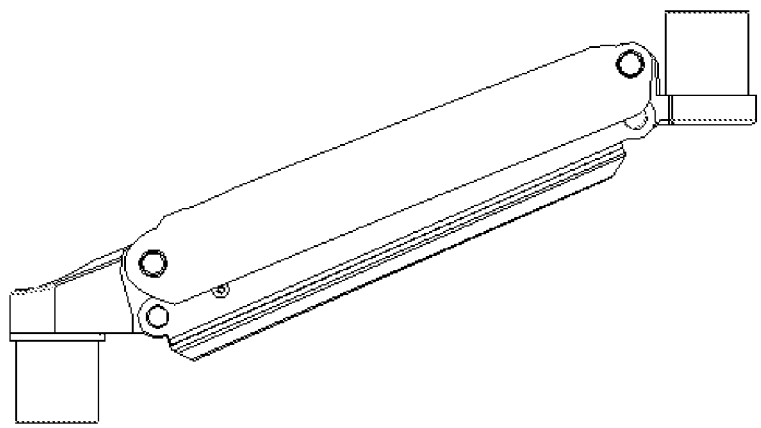
FIG. 3 is a front view of the present disclosure in a first mode.
Figure 4:
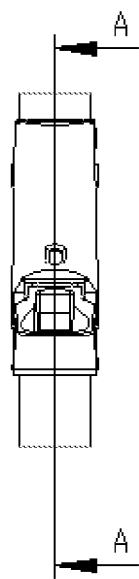
FIG. 4 is a left view the present disclosure in the first mode.
Figure 5:
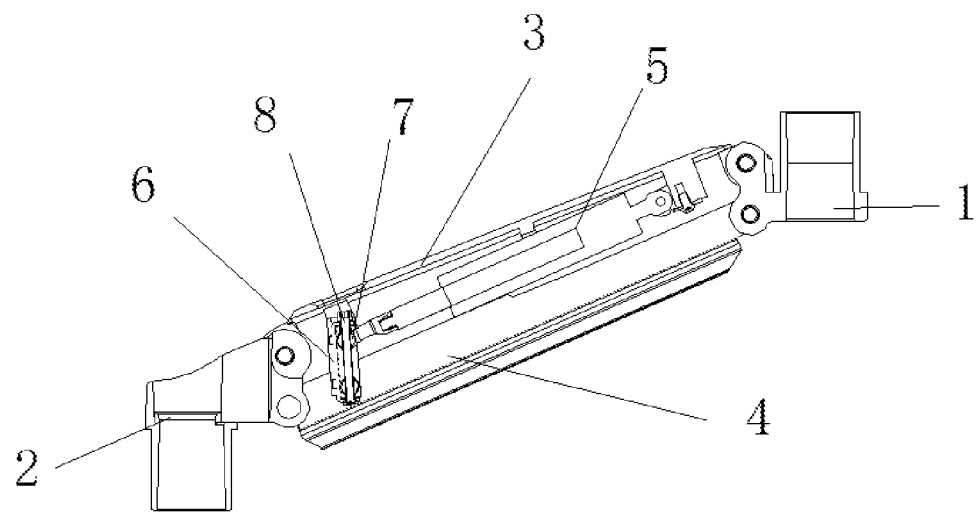
FIG. 5 is a sectional view taken along A-A line of FIG. 4.
Figure 6:
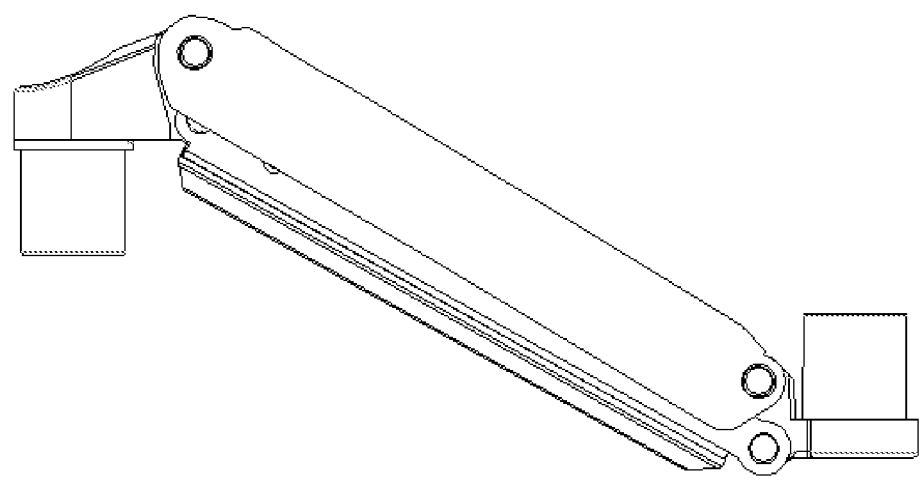
FIG. 6 is a front view of the present disclosure in a second mode.
Figure 7:
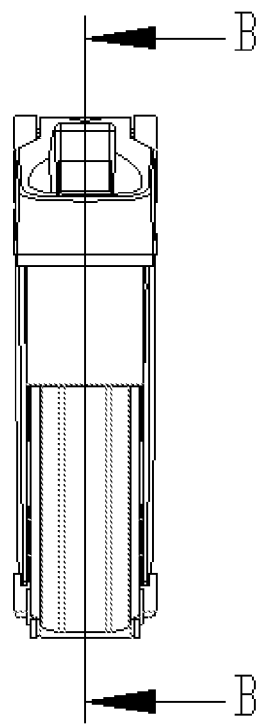
FIG. 7 is a left view of the present disclosure in the second mode.
Figure 8:
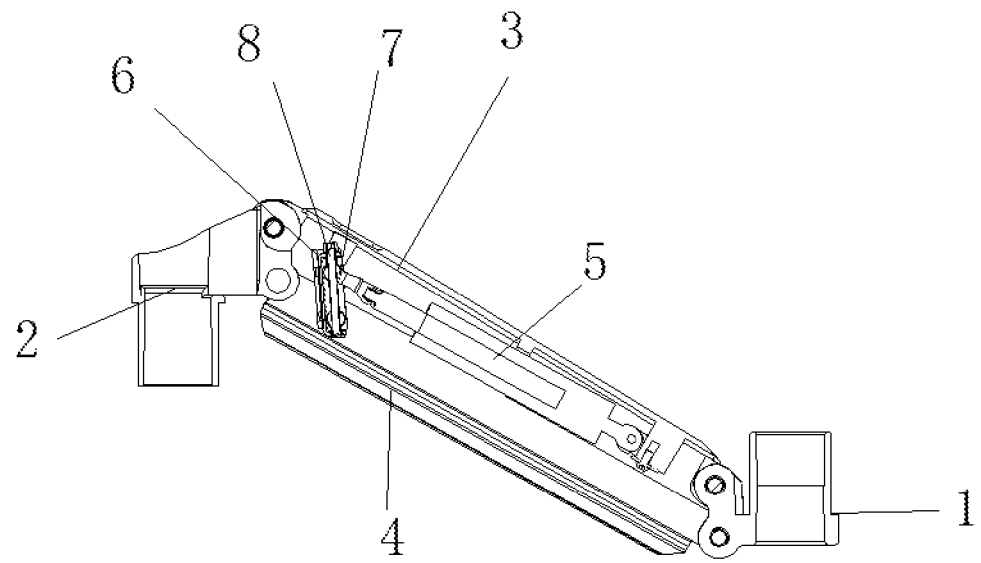
FIG. 8 is a sectional view taken along B-B line of FIG. 7.
Figure 9:
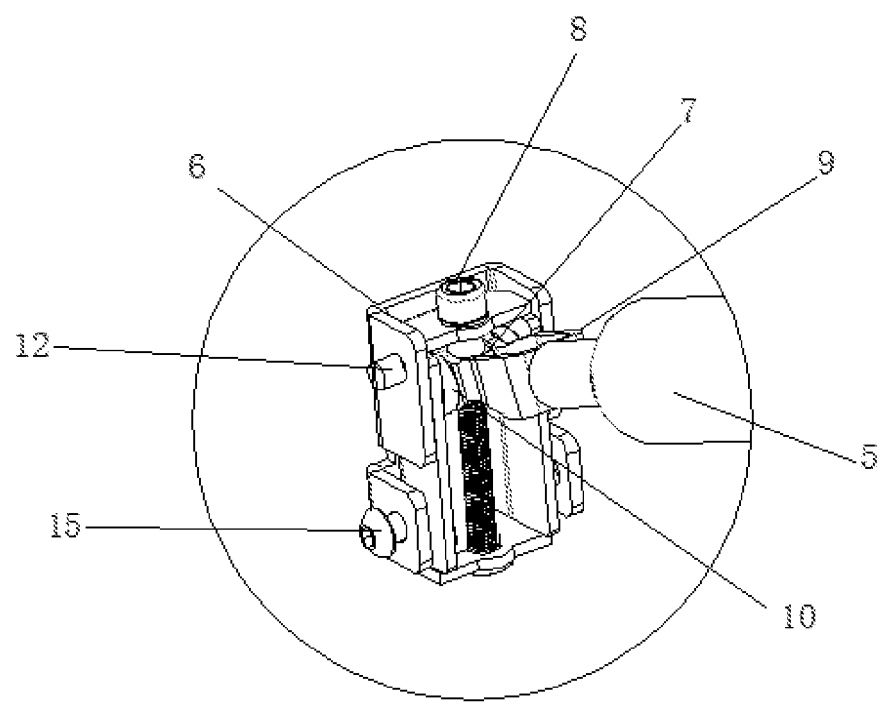
FIG. 9 is a schematic view of the adjusting means.

Example: an arm-supporting structure, including a front arm connector 1, a rear arm connector 2, an adjusting means for an upper support 3 and a lower support 4, and an elastic supporting means 5. The front arm connector 1, the upper support 3, the rear arm connector 2 and the lower support 4 are hingedly connected sequentially to form a parallelogram structure. The upper end and the lower end of the adjusting means are hingedly connected with the upper support 3 and the lower support 4, respectively. Two ends of the elastic supporting means 5 are connected to the adjusting means and the upper support 3, respectively, and the length of the elastic supporting means 5 is elastically stretchable.

During the use, the front arm connector 1, the upper support 3, the rear arm connector 2 and the lower support 4 form a parallelogram structure (the parallelogram structure ensures that the front and rear connectors have the same motion angle. The rear arm connector 2 forms an overall fixed support. Through the parallel swinging of the upper support 3 and the lower support 4, the front arm connector 1 is made to ascend or descend. The position of the front arm connector is supported and oriented by the elastic force from the elastic supporting means 5. The elastic supporting means 5 is swinging together with the swinging of the upper support 3 and the lower support 4 swings and changing its length accordingly, and constantly form a stable triangle supporting structure with the adjusting means and the upper support 3. The fulcrum of the elastic supporting means 5 is the hinge point between the elastic supporting means and the adjusting means. The fulcrum varies along with the swinging of the upper support and the lower support 4, and the torque it bears is also varying. It forms a balance with the elastic force that is generated by the elastic stretch from the elastic supporting means 5 when it swings together with the upper support and the lower support 4. The entire supporting structure can shift the fulcrum automatically to approach a balance. Regardless of the weight of the object to be mounted on the front arm connector, the structure will automatically adjust the fulcrum to reach a balance, and a wide range of bearing capacity is achieved. Moreover, the upper end and the lower end of the adjusting means are connected, respectively, to the upper support 3 and the lower support 4, and deliver the force applied thereon to the upper support 3 and the lower support 4, such that the upper support 3 and the lower support 4 together form a support. The adjusting means distributes the torque it bears to the upper support 3 and the lower support 4 and the adjusting means itself bears no torsional moment. Therefore, the adjusting means is not prone to damages as it only functions to adjust the length of the elastic supporting means 5, but not to bear torque.

The adjusting means is in parallel with the rear arm connector 2 and the front arm connector 1.

The adjusting means includes a bracket 6, a slide block 7 and a height adjusting mechanism. The upper and the lower ends of the bracket 6 are articulated (i.e., in hinge connection) with the upper support 3 and the lower support 4, respectively. The slide block 7 can be positioned movably on the bracket 6 along the extension direction of the bracket 6. The height adjusting mechanism can drive the movement of the slide block 7. One end of the elastic supporting means 5 is articulated with the slide block 7 and slides on the bracket 6 via the slide block 7. This thereby changes the distance from the hinge point between the adjusting means and the elastic supporting means 5, to the hinge point between the adjusting means and the upper support 3, and thus changes the length of a fixed edge of the supporting triangle, and further changes the degree of stretching of the elastic supporting means 5 when the upper support 3 and the lower support 4 are swinging to set an angle. Namely, the supporting force is changed such that electronic devices of different weights can be adapted to achieve a stable support. Since the fulcrum of the upper support 3 and the lower support 4 approaches balance automatically following the change at different swinging angles, the height adjusting mechanism only needs to overcome the weight of the slide block 7 itself during its adjustment on the slide block 7, which is easy and effort-saving.

The height adjusting mechanism is an adjusting screw 8 which can be rotatably positioned on the bracket 6 in circumferential direction but stopped in axial direction. The adjusting screw 8 is in threaded connection with the slide block 7. The upper support 3 is provided thereon with a hollow portion 17 that is directly facing the head portion of the adjusting screw 8. By rotating the adjusting screw 8, the ascending and descending of the slide block 7 is achieved. The structure is simple and the adjusting screw 8 is easy and effort-saving to be rotated. Furthermore, other height adjusting mechanisms may be provided, such as a crank-slide block 7 mechanism, a cylinder device or a gear rack mechanism.

The slide block 7 is provided at each of two sides with a first articulating shaft that extends in horizontal direction. One end of the elastic supporting means 5 is provided with a U-shaped member 9 having two connecting arms. The connecting arms of U-shaped connecting member 9 are sleeved on two sides of the slide block 7. Each of the connecting arms of the U-shaped member 9 is provided thereon with a shaft hole. The shaft hole is provided therein with a bearing 10. The first articulating shafts on the two sides of the slide block 7 are inserted into the bearings 10. The first articulating shaft is supported by the bearing 10, which ensures that the first articulating shaft rotates normally, such that the elastic supporting means 5 can swing together with the upper support 3 and the lower support 4 and automatically adjust its position to reach a balance of force.

The elastic supporting means 5 is provided thereon with a stud 11 that extends along an axial direction thereof. The U-shaped connecting member 9 is provided thereon with a threaded hole. The stud 11 on the elastic supporting means 5 is in threaded connection with the threaded hole on the U-shaped member 9. Through the threaded connection between the elastic supporting means 5 and the U-shaped member 9, the overall length of the elastic supporting means 5 may be changed, such that different elastic supporting forces can be provided. In this way, electronic devices of different weights may be supported and the elastic force can be compensated while the supporting elasticity is decreased due to a long-term use.

The elastic supporting means 5 is a gas spring, but can also be a compression spring.

Two sides of upper end of the adjusting means are provided, respectively, with a second articulating shaft 12 that extends in horizontal direction. The inner side surface of the upper support 3 is provided thereon with an opening slot 13. The second articulating shaft 12 is rotatably inserted right into the opening slot 13 of the upper support 3. Two sides of lower end of the adjusting means are each provided with a threaded connecting hole that extends axially in the horizontal direction. Two sides at one end of the lower support 4 are each provided with a through-hole 14, and a connecting screw 15 is further provided. The connecting screw 15 is configured to pass (or penetrate) through the through-hole 14 located on the two sides of the one end of the lower support 4, and is in threaded connection with the threaded connecting hole provided on the adjusting means.

The opening slot 13 on the upper support 3 is an elongated opening slot structure perpendicular to the inner side surfaces of the upper support 3. An opening portion of the opening slot is provided at each of two inner sides with a chamfer structure. Through the elongated opening slot, the hinge position of the upper end of the adjusting means may be adjusted, such that electronic devices of different weights can be adapted and the machining error can be compensated.

The upper support 3 and the lower support 4 are in U-shaped structures with openings of the U-shaped structures opposing to each other. The sides of two ends of the upper support 3 and the lower support 4 are each configured to have an arc-shaped end face. The front arm connector 1 and the rear arm connector 2 are each inserted into the inner sides of the two ends of the upper support 3 and the lower support 4. The side of the rear arm connector 2 is further provided thereon with a curved stepped stopping face 16 that matches the arc-shaped end faces of the upper support 3 and the lower support 4. The arc-shaped end faces of the upper support 3 and the lower support 4 are configured to be rotatably stopped by the curved stepped stopping face 16 of the rear arm connector 2. The rear arm connector 2 functions to support one end of the upper support 3 and the lower support 4, to reduce the shear force borne by the hinge bearing 10, to protect the articulating shaft from damage, and to increase the life span of the whole mechanism.

The invention claimed is:

1. An arm-supporting structure, comprising a front arm connector, a rear arm connector, an upper support, a lower support, an adjusting means and a supporting means, wherein the front arm connector, the upper support, the rear arm connector and the lower support are articulated sequentially to form a parallelogram structure, an upper end and a lower end of the adjusting means are articulated with the upper support and the lower support, respectively, two ends of the supporting means are connected with the adjusting means and the upper support, respectively, and the supporting means is adjustable in length, wherein the adjusting means comprises a bracket, a slide block and a height adjusting mechanism, an upper end and a lower end of the bracket are articulated with the upper support and the lower support, respectively, the slide block is positioned on the bracket, and the slide block is configured to move along a length direction of the bracket, the height adjusting means is configured to drive the slide block to move, and one end of the supporting means is articulated with the slide block.

2. The arm-supporting structure according to claim 1, wherein the supporting means is a gas spring.

\* \* \* \* \*